US006408582B1

(12) United States Patent
Shim

(10) Patent No.: US 6,408,582 B1
(45) Date of Patent: *Jun. 25, 2002

(54) INSULATION SYSTEM OF A BUILDING WHEREIN VERTICAL AIR-FLOW ZONES DIVIDED BY ORIENTATION OR EACH FACADE OF THE BUILDING IS CONTROLLED BY OPEN-CLOSE METHOD

(75) Inventor: Shang Kooun Shim, Seoul (KR)

(73) Assignee: Himmsen Esco Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/559,576

(22) Filed: Apr. 28, 2000

(30) Foreign Application Priority Data

Apr. 30, 1999 (KR) ............................... 99-15742

(51) Int. Cl.⁷ ................................. E04F 17/04
(52) U.S. Cl. ...................... 52/302.1; 52/302.3; 52/404.1
(58) Field of Search ............................. 52/302.1, 302.3, 52/404.1

(56) References Cited

U.S. PATENT DOCUMENTS 2,645,824 A * 7/1953 Titsworth ................... 52/302.3
4,286,420 A * 9/1981 Pharmakidis ............... 52/302.3

FOREIGN PATENT DOCUMENTS

| KR | 186966 | 12/1998 |
| KR | 186967 | 12/1999 |

* cited by examiner

Primary Examiner—Beth A. Stephan
Assistant Examiner—Dennis L. Dorsey
(74) Attorney, Agent, or Firm—Birch, Stewart, Kolasch & Birch, LLP

(57) ABSTRACT

A heat insulation system of a building includes a plurality of interior walls surrounding an inner space of the building, a plurality of exterior walls constructed outside of the plurality of interior walls with certain distance therebetween. Further included are an air-flow zone defined by a space formed between the plurality of interior walls and the plurality of exterior walls, and a plurality of air-flow zone dividers dividing the air-flow zone into a plurality of air-flow blocks, where air-flow zone dividers of the plurality of air-flow zone dividers are placed appropriately so as to define each air-flow block of the plurality of air-flow blocks in accordance with facades of the building.

7 Claims, 7 Drawing Sheets

INSULATION SYSTEM OF A BUILDING WHEREIN VERTICAL AIR-FLOW ZONES DIVIDED BY ORIENTATION OR EACH FACADE OF THE BUILDING IS CONTROLLED BY OPEN-CLOSE METHOD

BACKGROUND OF THE INVENTION

1. Field of the Invention

The present invention relates to a heat insulation system of a building. Especially, the present invention relates to a heat insulation system in which artificial changes are possible according to the need of environment. According to the heat insulation system of the present invention, a vertical air-flow zones are divided by orientation or each facade of the building and are controlled by opening and closing the air flow zones.

2. Description of the Background Art

In general, in order to protect the inside temperature of a building from exterior temperature, heat insulation materials of a certain thickness are formed on the exterior wall of the building. In order to obtain more effective heat insulation, there is a system in which an air-flow zone is further formed on the exterior wall of the building. In case of using this heat insulation system, the heat energy which is transferred from the outside to the inside of the building is re-exhausted to the outside through the air-flow zone especially in summer. The heat energy of the living space of the building is prevented from being transferred to the outside of the building. This means that the air-flow zone plays an important role as a heat insulator of the building. In relation to this conventional system, the applicant has obtained Patents No.186966 and No.196967 from the Korean Intellectual Property Office.

The above mentioned conventional art is summarized hereinafter with reference to the FIG. 1 and FIG. 2. Construct the exterior wall 10 of the building and the interior wall 20 with a heat insulation material 21 on its surface having a certain distance from the exterior wall 10 of the building. As a result, space is formed between the exterior wall 10 and the interior wall 20 and this space is the air-flow zone 50. An in-flow entrance 51 is formed at the lower part of the exterior wall 10 and an out-flow entrance 53 is formed at the upper part of the exterior wall 10 of the building. When the outside circumstance has a high temperature, i.e., in summer, high thermal energy(for example, the sun energy 80) radiates into the building through the exterior wall 10 from the outside circumstance. The thermal energy flown into the air-flow zone 50 heats up the air inside the air-flow zone 50. The heated air flows out through the out-flow entrance 53 as the warm air rises upward. The air outside the building which has lower temperature than the air in the air-flow zone 50 flows into the air-flow zone 50 through the in-flow entrance 51. Therefore, the thermal energy cannot be transferred to the inner space of the building but re-exhausted to the outside of the building. In order to enhance the function of the air-flow zone 50, a power fan 55 is installed at the out-flow entrance 53 or the in-flow entrance 51. Then the air circulation is more activated.

In the conventional system of the heat insulation of the building, the air-flow zone 50 is formed at the surface part of the building and this air-flow zone 50 envelopes the surface of the building as one structure. In other words, the air can flow inside the air-flow zone 50 horizontally and vertically as there is no division in all parts of the air-flow zone 50. However, each side of walls have different thermal conditions according to the direction, the amount of the sunshine, the amount of the radiation and the situation of the air streams. As the altitude of the sun differs seasonally, each side of wall of the building receive different thermal energy. For example, in winter when the sun has low altitude, the south side exterior wall receives bigger amount of thermal energy than the other sides. In summer time, the west side exterior wall receives more thermal energy than the south side exterior wall due to the altitude of the sun and duration of radiation received. Therefore, an air-flow block which is separately divided at the air-flow zone according to the direction and facade of the building is needed as the patterns and the numerical values of the absorbed thermal energy through the exterior wall differs by the daily and seasonal changes of the sun energy.

SUMMARY OF THE INVENTION

An object of this invention is to enhance the heat insulation capability of the building using an air layer surrounding the building. Another object of the present invention is to suggest a heat insulation system of a building in which an air flow zone is formed between the interior wall and the exterior wall by forming the exterior wall with a certain distance from the interior wall, and an air-flow zone divider which divides the air flow zone into a column space according to the direction and facades of the building.

BRIEF DESCRIPTION OF ATTACHED DRAWINGS

DETAILED DESCRIPTION OF THE INVENTION

Figure 1:
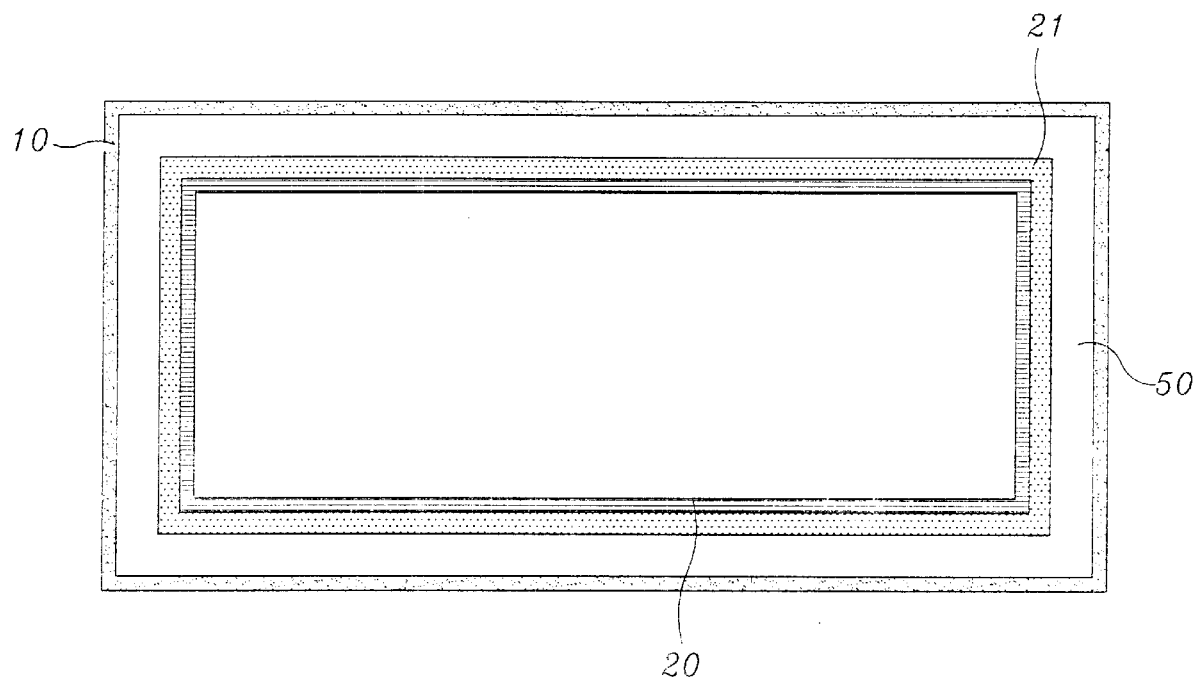
FIG. 1 is a horizontal cross-sectional view of the conventional art of the heat insulation system for a building.
Figure 2:
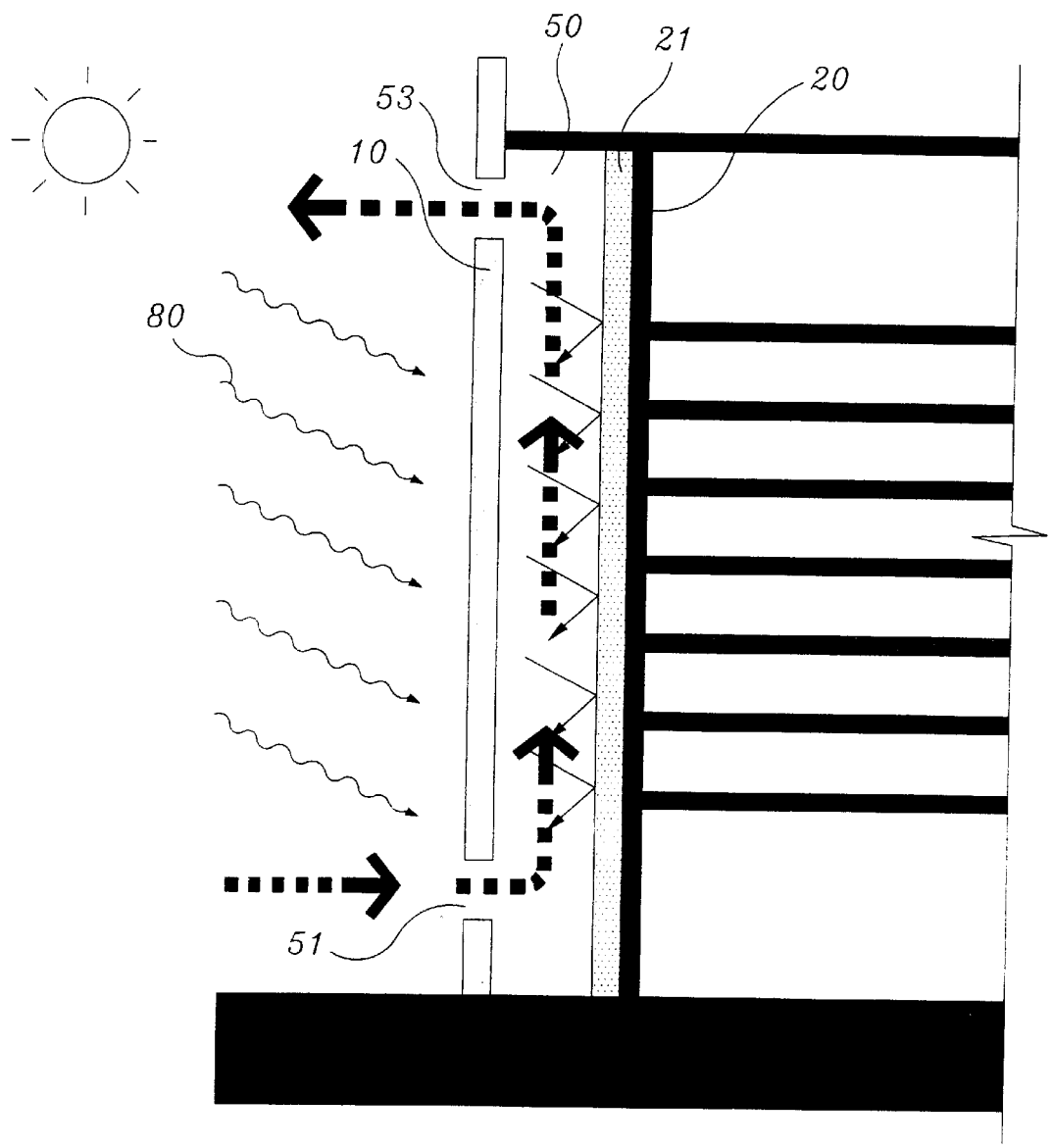
FIG. 2 is a vertical cross-sectional view of the conventional heat insulation system for a building showing the role of the air flow zone preventing the heat from transferring into the inner space by ventilation of the air-flow zone.
Figure 3:
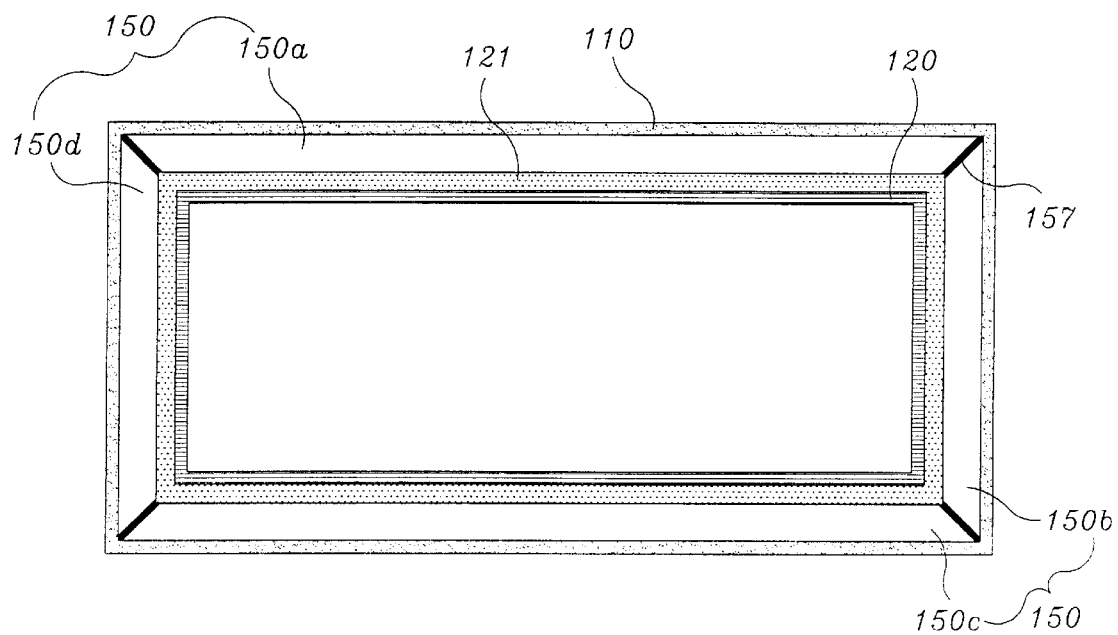
FIG. 3 is a horizontal cross-sectional view of a heat insulation system for a building according to the present invention.
Figure 4:
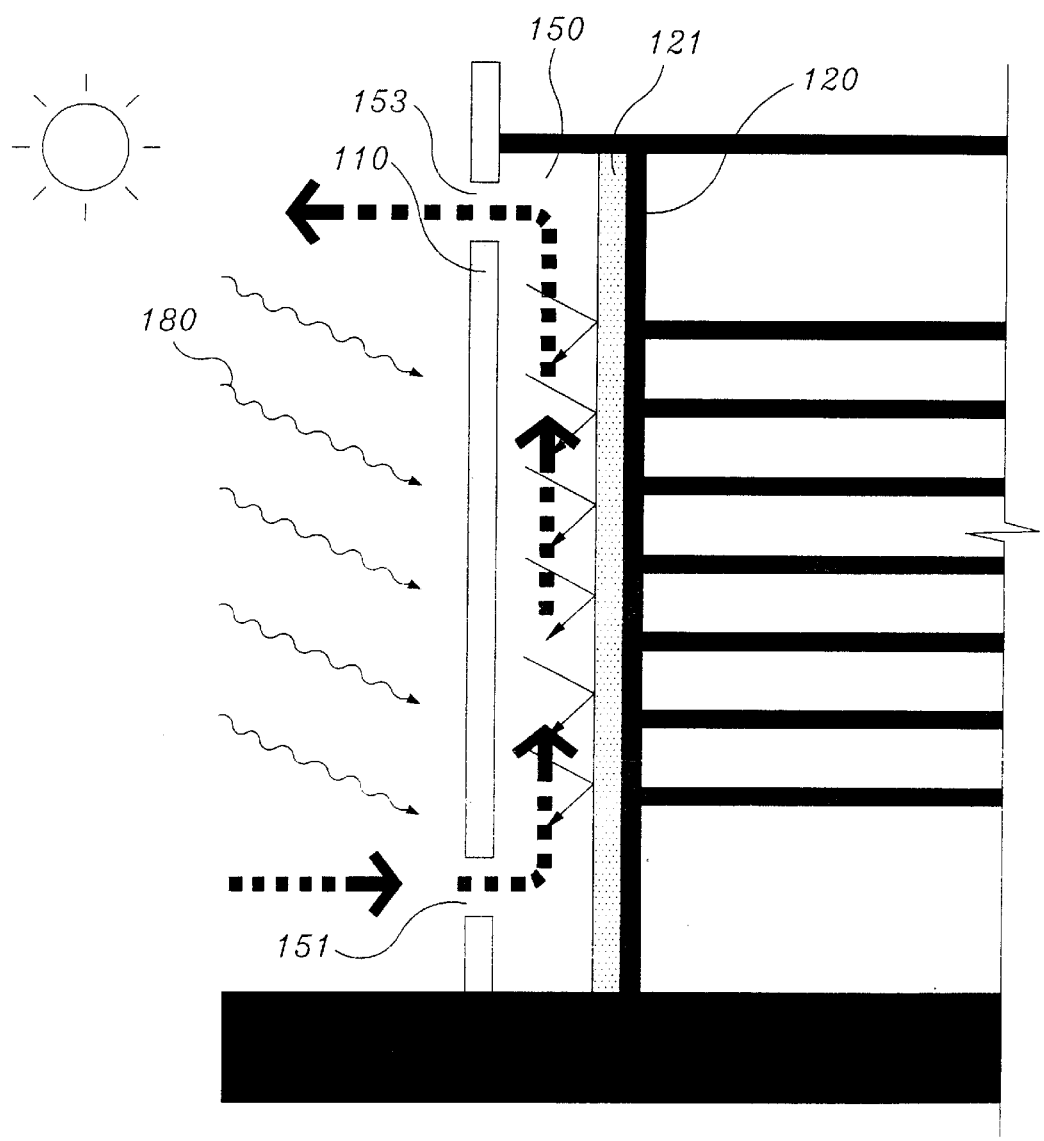
FIG. 4 and 5 are vertical cross sectional views of a heat insulation system for a building showing the function of air flow zone according to the present invention.
Figure 5:
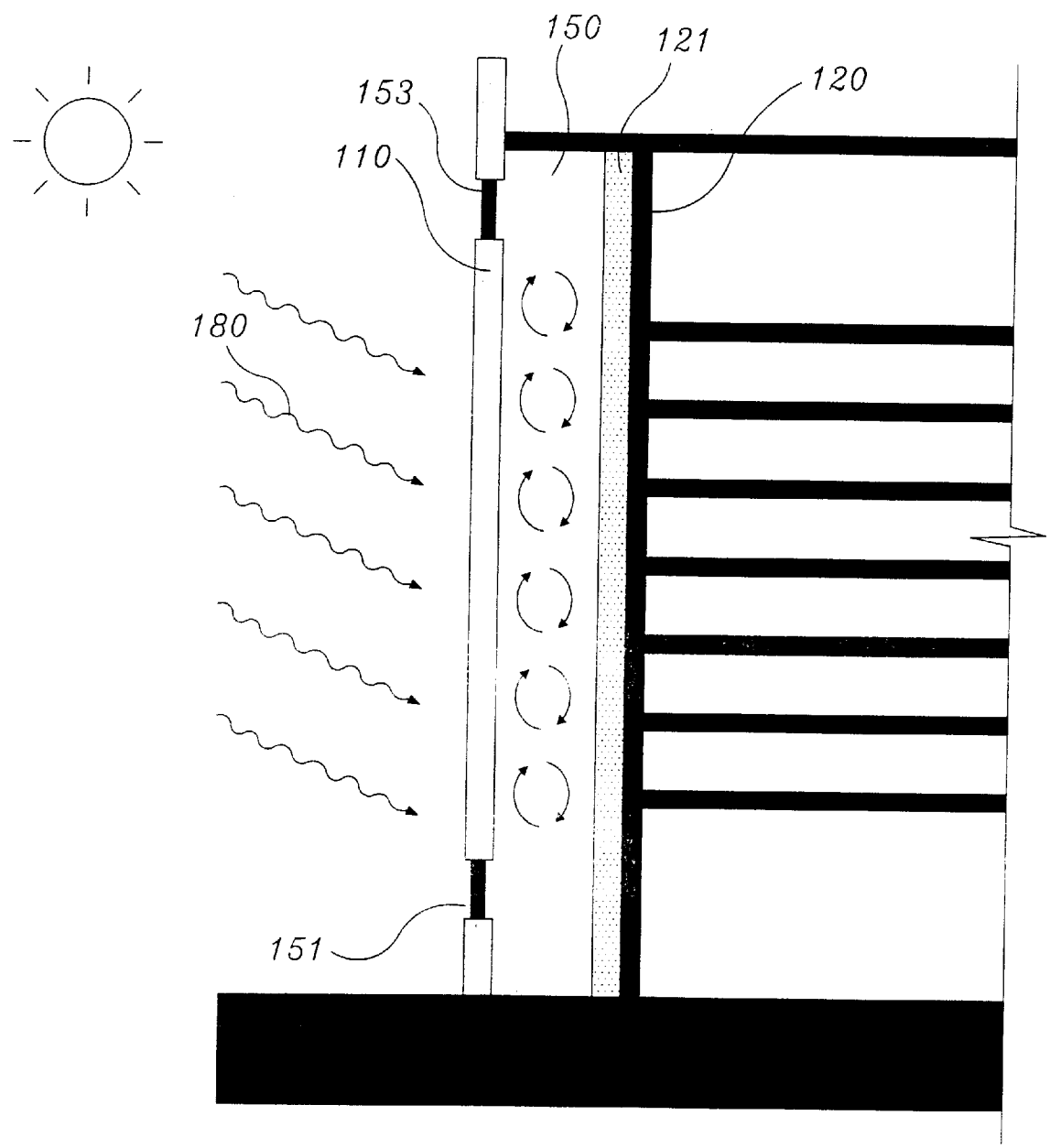

Hereinafter, we will explain the present invention referring to FIGS. 3 to 5, showing a cross sectional view of the heat insulation system according to the present invention. In the present invention, an interior wall 120 surrounding the inner space of the building is constructed. In some cases, a heat insulation material 121 is formed at the exterior surface or the interior surface of the interior wall 120 in order to prevent the inside heat energy from transferring outwards. At the same time the heat transferring from the outside to inside of the building is prevented.

An exterior wall 110 which decorates the shape of the building is formed with a certain distance from the interior wall 120. In some cases, a heat insulation material 121 is formed at the inside-surface of the exterior wall 110. The space formed between the exterior wall 110 and the interior wall 120 is an air-flow zone 150. An air inside an air-flow zone 150 serves as an air layer which blocks the heat energy transferred from the outside of the building or which blocks the heat energy transferred from the inner space of the building.

In general, a building has four facades and each of these facades receive different heat energy according to the different natural environment it faces. According to the situation, one facade can have higher thermal energy than the other facades. In this case, the air in the air-flow zone block of the facade which has high thermal energy is heated up more than others. Therefore, this heated air has to be exhausted to the outside of the air-flow zone 150. On the other hand, it is not necessary to exhaust the air inside the other air-flow zone blocks which have lower thermal energy. So, it is preferred to have an air-flow zone divider 157 which divides the air-flow zone into four air-flow blocks 150*a*, 150*b*, 150*c* and 150*d* according to the facade or directions. In case that the air-flow zone 150 is divided into four directions, the east air-flow block 150*a*, the west air-flow block 150*b*, the south air-flow block 150*c* and the north air-flow block 150*d*, the heated air in the south air-flow zone 150*c* should only be exhausted outwards if the south facade receives the heat energy intensively, and as a result, the insulation is effected.

In order to make the air current, ventilation entrances are formed at the upper and lower part of each blocks of the air-flow zone 150 by forming entrances at the exterior wall 110. The air heated inside a certain air-flow block 150*a*, 150*b*, 150*c* or 150*d* is exhausted through the out-flow (ventilation) entrance 153 formed at the upper part of the air-flow block and at the same time, the external air which has lower temperature than the air inside the air-flow block is flown through the in-flow(ventilation) entrance 151 formed at the lower part of the air-flow block. In order to accelerate the air current, it is good to install a power driven fan 155 at the out-flow entrance 153 or at the in-flow entrance 151.

Figure 6:
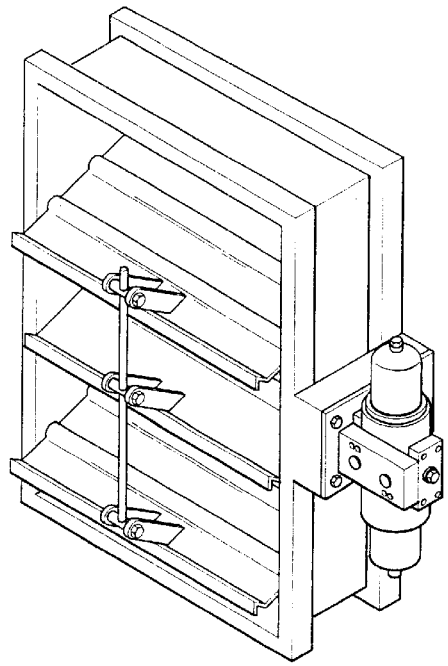
FIG. 6 is an instrument for ventilation.
Figure 7:
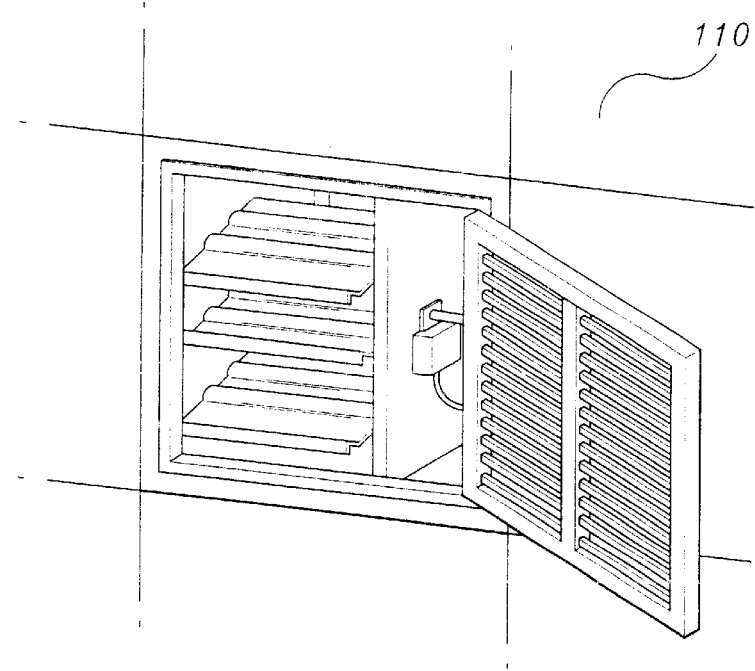
FIG. 7 is an example of in-flow/out-flow entrance in which the ventilation entrance is applied according to the present invention.
Figure 8:
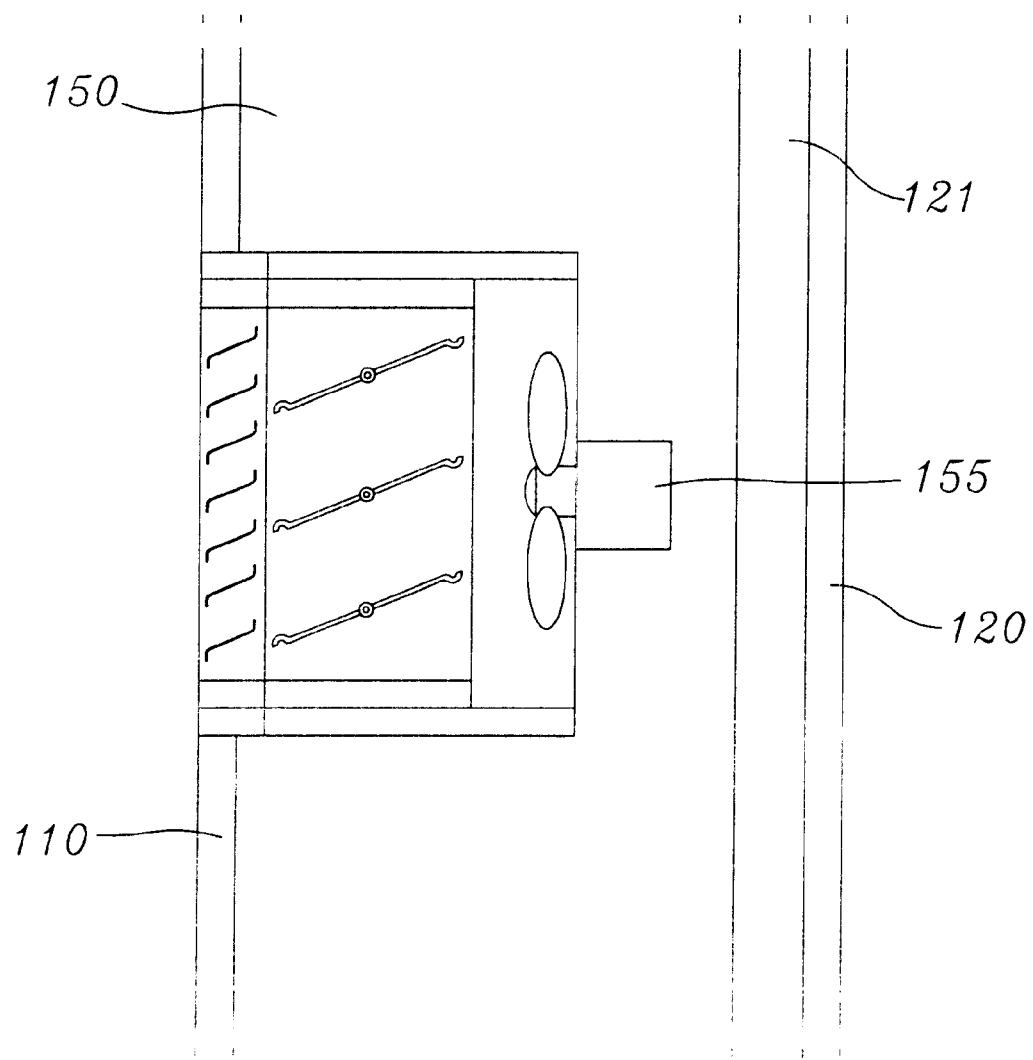
FIG. 8 is a power driven fan installed at the ventilation instrument.

FIG. 4 shows a status of an air flow zone exhausting the air in order to enhance the heat insulation of the inside of the building by preventing the outside heat energy from transferring when the outside temperature is high. FIG. 5 shows a status of accumulating the heated air by the sun energy at the exterior wall of the building by shutting up the air of the air flow zone in order to enhance the heat insulation of the inside of the building by preventing the inside heat energy of the building from being taken away when the outside temperature is low. FIG. 6 is an example showing an instrument(e.g. a Mortor Volume Damper) which has an opening and closing function for circulating and blocking the air flow of the air flow zone. FIG. 7 shows an entrance in which the air in-flow/out-flow entrance show in FIG. 6. FIG. 8 shows a power driven fan 155 which is installed at the out-flow or in-flow entrance.

ADVANTAGE OF THE INVENTION

According to the present invention, the heat insulation is more effective than the conventional arts. The present invention suggests a heat insulation system in which a plurality of air-flow blocks are formed and the air-flow blocks are artificially controlled so that some opened blocks effectively prevent the outside heat energy from transferring into the inner space of the building. Furthermore, some blocks in which the air temperature should be preserved as it is and not be lowered are closed so that the air kept in the air-flow blocks can act as an air layer which maintains the inside thermal energy and which prevents the inside thermal energy transferring outside.

I claim:

1. A heat insulation system of a building, comprising:
   a plurality of interior walls surrounding an inner space of the building;
   a plurality of exterior walls constructed outside of the plurality of interior walls with a certain distance therebetween;
   an air-flow zone defined by a space formed between the plurality of interior walls and the plurality of exterior walls; and
   a plurality of air-flow zone dividers dividing the air-flow zone into a plurality of independently controllable air-flow blocks, the plurality of air-flow zone dividers being arranged so that each air-flow block of the plurality of independently controllable air-flow blocks corresponds with a respective facade of the building.

2. The heat insulation system for a building according to the claim 1, further comprising at least one ventilation entrance at an upper part and a lower part of at least one of the air-flow blocks.

3. The heat insulation system for a building according to the claim 1, further comprising a heat insulation material which is formed on at least one of the surfaces of the plurality of interior walls and the plurality of exterior walls.

4. The heat insulation system for a building according to the claim 1, further comprising an opening and closing system for a lower and upper air flow entrance.

5. The heat insulation system for a building according to claim 1, wherein the building has essentially four facades, each of the at least four facades facing in an essentially different geographic direction.

6. The heat insulation system for a building according to claim 2, further comprising at least one fan.

7. The heat insulation system for a building according to claim 4, wherein each of the independently controllable air flow blocks respectively includes an opening and closing system for a lower and upper air flow entrance and at least one fan.

* * * * *